United States Patent
Guirauton et al.

(10) Patent No.: US 7,174,159 B2
(45) Date of Patent: Feb. 6, 2007

(54) METHOD OF SECURING A MOBILE TELECOMMUNICATION TERMINAL

(75) Inventors: Alain Guirauton, Argenteuil (FR); Marielle Crozat, Croissy sur Seine (FR); Christian Massy, Sevres (FR)

(73) Assignee: TCL Communication Technology Holdings Limited, Kowloon (HK)

( * ) Notice: Subject to any disclaimer, the term of this patent is extended or adjusted under 35 U.S.C. 154(b) by 190 days.

(21) Appl. No.: 10/610,705

(22) Filed: Jul. 2, 2003

(65) Prior Publication Data

US 2004/0005911 A1 Jan. 8, 2004

(30) Foreign Application Priority Data

Jul. 4, 2002 (FR) .................................. 02 08375

(51) Int. Cl.
*H04M 1/66* (2006.01)
(52) U.S. Cl. .................. 455/411; 455/551; 455/558
(58) Field of Classification Search ............ 455/550.1, 455/558, 557, 410, 411, 551; 380/247, 249, 380/248
See application file for complete search history.

(56) References Cited

U.S. PATENT DOCUMENTS

| | | | | |
|---|---|---|---|---|
| 5,497,411 A * | 3/1996 | Pellerin | ................ | 455/411 |
| 5,940,773 A * | 8/1999 | Barvesten | ................ | 455/558 |
| 6,463,300 B1 * | 10/2002 | Oshima | ................ | 455/558 |
| 6,603,982 B1 * | 8/2003 | Muller | ................ | 455/558 |
| 6,714,799 B1 * | 3/2004 | Park et al. | ................ | 455/558 |
| 2002/0142813 A1 * | 10/2002 | Cassidy et al. | ............. | 455/575 |
| 2002/0147028 A1 * | 10/2002 | Alos et al. | ................ | 455/558 |
| 2002/0169966 A1 * | 11/2002 | Nyman et al. | ............. | 713/182 |
| 2004/0014423 A1 * | 1/2004 | Croome et al. | ............ | 455/41.2 |
| 2004/0236693 A1 * | 11/2004 | Quesselaire | .................. | 705/50 |

FOREIGN PATENT DOCUMENTS

| | | |
|---|---|---|
| EP | 0 607 767 A1 | 7/1994 |
| EP | 0 822 730 A2 | 2/1998 |
| EP | 1 047 277 A2 | 10/2000 |
| EP | 1 107 627 A1 | 6/2001 |
| FR | 2 791 509 A1 | 9/2000 |
| FR | 2 797 138 A1 | 2/2001 |

\* cited by examiner

*Primary Examiner*—Duc Nguyen
*Assistant Examiner*—Dai Phuong
(74) *Attorney, Agent, or Firm*—Morgan, Lewis & Bockius LLP

(57) ABSTRACT

A method of securing the use of a mobile telecommunication terminal comprising a (U)SIM card reader includes a terminal initialization step consisting of requesting the user to enter a personal password after inserting a (U)SIM card into the terminal and storing the password in the (U)SIM card and in memory in the terminal. On the occasion of subsequent uses the password is verified either against the password stored in the card or against the password requested of the user, and operation of the terminal is disabled in the event of a mismatch. Applications include mobile telecommunication terminals.

16 Claims, 2 Drawing Sheets

I Initialization

II Subsequent uses

METHOD OF SECURING A MOBILE TELECOMMUNICATION TERMINAL

CROSS-REFERENCE TO RELATED APPLICATIONS

This application is based on French Patent Application No. 02 08 375 filed Jul. 4, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of securing a mobile telecommunication terminal. It also relates to a mobile terminal including means for implementing the method.

2. Description of the Prior Art

A true social phenomenon, the mobile telephone is part of our everyday environment, with hundreds of millions of mobile telephones in use worldwide. These telecommunication terminals generally include a microchip card conventionally referred to as a (U)SIM card.

A (U)SIM card contains information that cannot be modified by the user and which identifies the card and the user, for example by numbers consisting of the identification number (ICCid) of the integrated circuit on the card and the international mobile subscriber identity (IMSI) of the user. The (U)SIM card is handed over by a telecommunication operator when a mobile telephone is acquired. It is inserted into the mobile telephone and activates the latter when the user enters a personal identification number (PIN) via the keypad.

The PIN is stored in a secure manner by the card and is known only to the user. Each time the telephone is switched on, the user is prompted to enter the PIN, unless this function has been disabled.

The (U)SIM card further contains in non-volatile memory a program for communicating with the terminal. The program corresponds to the protocol for communication with mobile telephone terminals conforming to the GSM TS 11—11 and 3GPP (TS 31.101) standards.

The (U)SIM card also contains one or more application programs in a program memory.

The mobile terminal of a user Ao is consequently equipped with a reader for (U)SIM smart cards, which in particular identify the user. The reader enables communication with the (U)SIM card Co of the user. To this end the card reader includes a man-machine interface enabling interaction of the user and the card via the terminal. For the purposes of this dialog, the user has access to a display (screen) and input (keyboard) interface.

The terminal is also equipped with other electronic circuits that there is no need to describe in detail for an understanding of what follows, such as data processing means, program and data storage means, and mean, for communication with the outside world, for example with another electronic device and also with one or more telecommunication networks.

The problem addressed is explained hereinafter.

The growth in the mobile telephone market has given rise to a growing black market in stolen mobile telephones.

A thief stealing the telephone of another person can use it if it is active until the battery runs out. After that, he cannot use it without knowing the owner's PIN (if the function is activated, which is the default option). However, it is entirely possible for the thief to install another smart card (of the (U)SIM or other type) and to use the stolen mobile telephone with the new smart card.

Thus a recent technology telephone may be stolen to replace an old telephone. There is therefore a trade in stolen telephones, since persons acquiring them can use them, for example by inserting a prepaid calling card, or recover the (U)SIM card from an old design of telephone and install it in the purchased/stolen new design.

This market is viable in that it is possible to use a telephone with a (U)SIM card other than that of the original user.

One solution to this problem known to the person skilled in the art is to lock the operation of the mobile telephone to the (U)SIM card with which it was supplied in a purchase pack (telephone and subscription). This SIM Lock mechanism is defined by the ETSI. It protects the operator against the use of a telephone with a subscription taken out with another operator. This solution is managed by the telecommunication operator for a limited time period. Because this is a mature market, consumers purchase recent terminals to use with their existing subscription (SIM). In practical terms, a user whose telephone has been stolen calls his telecommunication operator to report the theft and the operator blocks the use of his (U)SIM card. It can be seen that this solution protects the user against the use of his subscription (although his PIN would have to be found out, if the function is active), and avoids the operator getting embroiled in disputes concerning refusal to pay.

This solution does not solve the problem of theft, since a stolen telephone can be used.

There is a solution that analyzes the user's fingerprint in order to authorize the use of a mobile telephone.

However, this kind of solution prevents users sharing the mobile telephone; for example, the user cannot lend his mobile telephone to a family member or friend. Furthermore, additional equipment for analyzing the fingerprint is necessary and adds to the cost of the mobile telephone.

An object of the present invention is to remedy this situation.

SUMMARY OF THE INVENTION

The invention provides a method of securing the use of a mobile telecommunication terminal comprising a (U)SIM card reader, which method includes, for the terminal:
an initialization step consisting of:
  requesting the user to enter a personal password after inserting a (U)SIM card into the terminal,
  storing said password in the (U)SIM card and in memory means of the terminal,
  and then on the occasion of subsequent uses:
  verifying the password either against the password stored on the card or against the password requested of the user,
  disabling its operation in the event of a mismatch.

According to another feature, if the password supplied by the card is not the same as that which is stored or recalculated in the memory means, the terminal prompts the user to enter his password in order to compare it to the stored password.

The user is advantageously able to enter the stored password N times and if there is no match after N attempts the terminal destroys the password stored on the (U)SIM card and deactivates itself.

One variant of the terminal encrypts the password before storing it on the memory means and on the card.

The password can be encrypted by a DES function or a hashing function applied to input data consisting of the personal identification number and the password or of data internal to the terminal (for example its IMSI) and the password.

The invention also provides a mobile telecommunication terminal including memory means including a program memory containing a program adapted to execute a method according to the invention.

According to another feature the program memory is in an application specific integrated circuit.

According to another feature the terminal includes a communication interface for communicating with an external memory device connected to the terminal to store the password.

Other features and advantages of the invention will become clearly apparent on reading the following description, which is given by way of nonlimiting example and with reference to the accompanying drawings.

DETAILED DESCRIPTION OF THE PREFERRED EMBODIMENT

The present invention proposes a solution to the problem of theft of mobile telephones that prevents the use of a mobile telephone by an unauthorized person. Accordingly, in due course it will be widely realized that a stolen terminal cannot be used, and the black market for stolen terminals should disappear and public safety should increase.

To this end, the method proposes a solution consisting of blocking the operation of the mobile telephone by a security mechanism executed by the mobile telephone itself.

Figure 1:
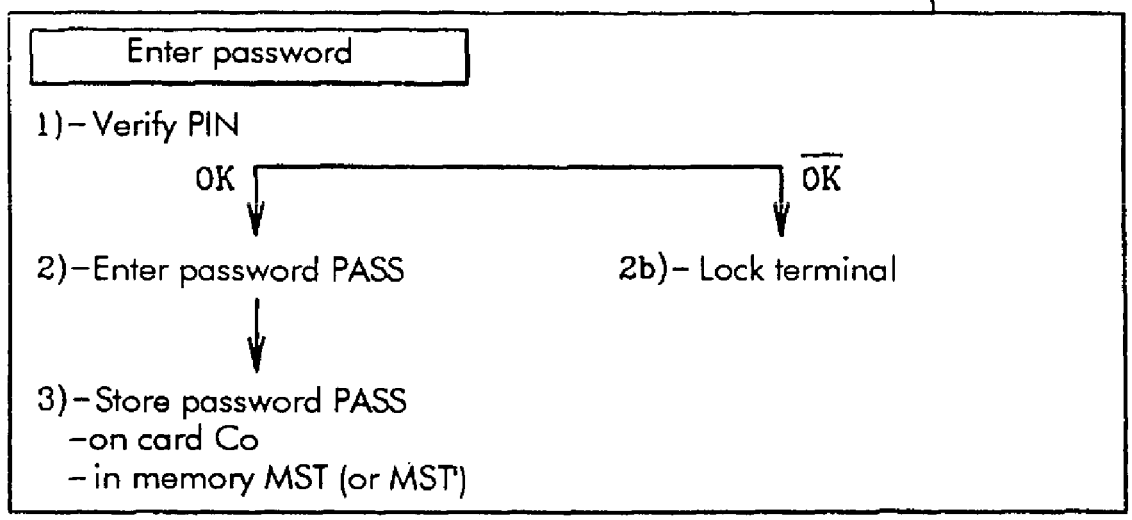
FIG. 1 shows steps of a method according to the invention.
Figure 1:
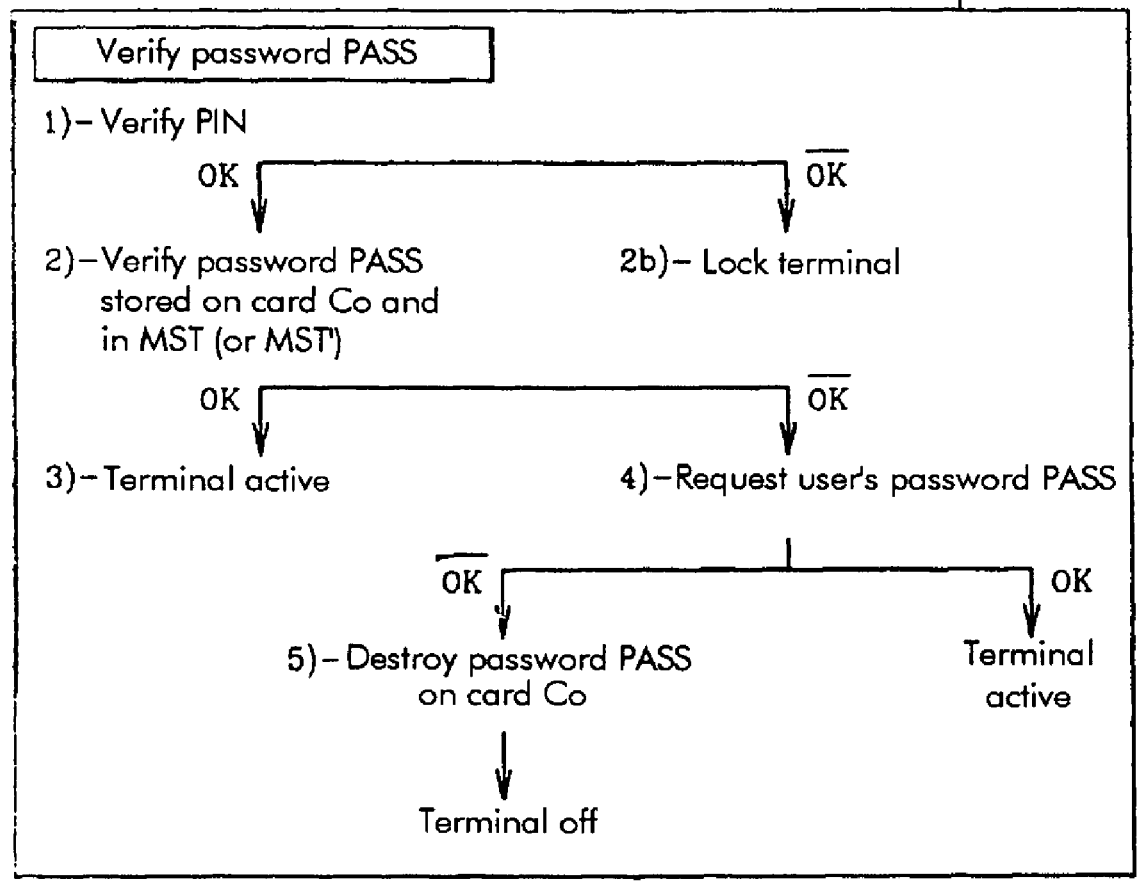
Figure 2:
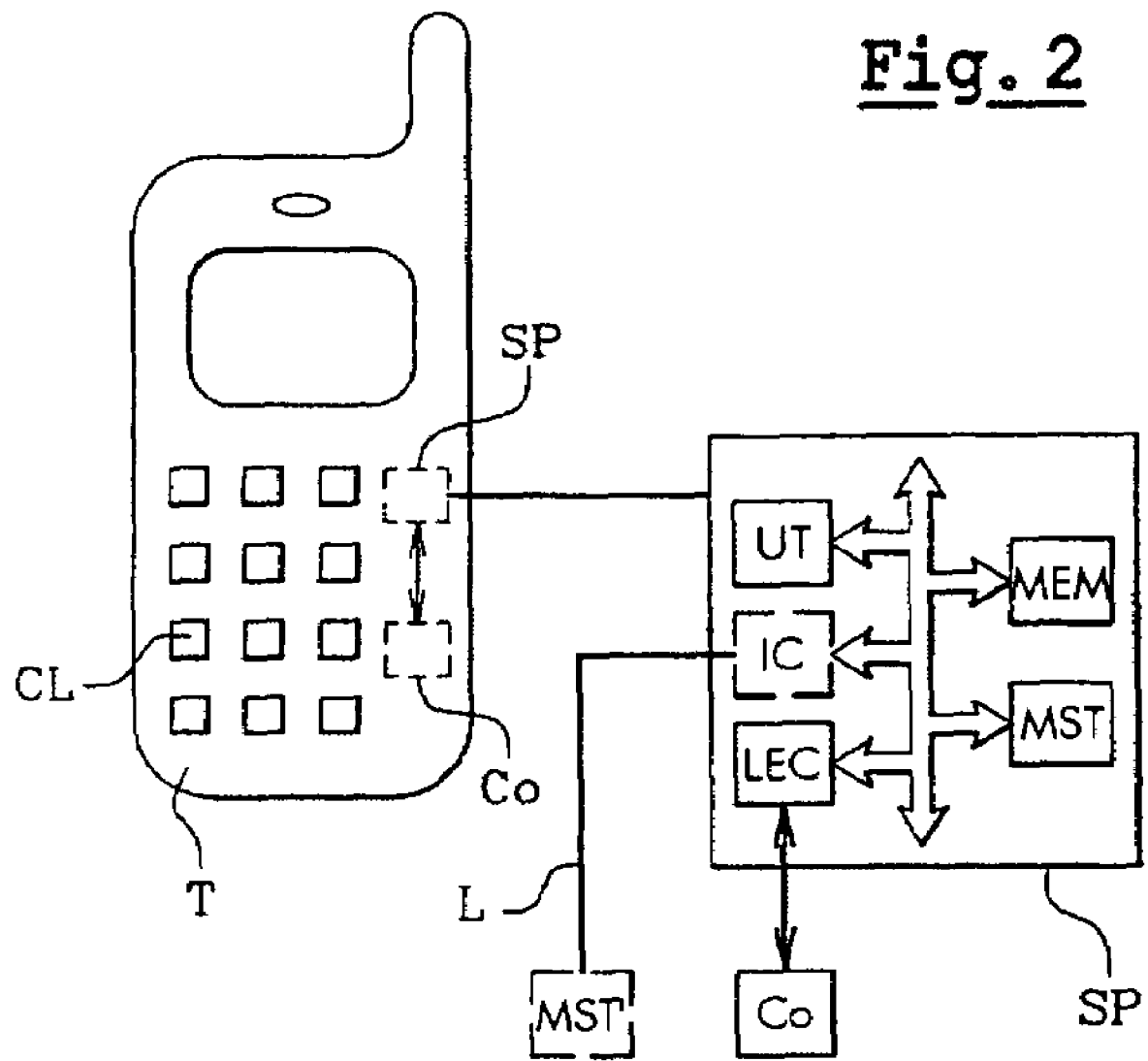
FIG. 2 is a simplified block diagram of a telephone.

As shown in FIG. 1, the mechanism includes an initialization step I executed once for each new (U)SIM card inserted into the terminal, followed by a step II of verifying the password on subsequent use. The description given hereinafter also refers to FIG. 2, which shows a simplified electronic circuit diagram of the terminal. Only components relevant to implementing the present invention are shown, namely a processor unit UT, a program memory MEM, a data memory MST, a smart card reader LEC, and a communication interface with an external memory device MST'.

I—Initialization Step: Storing of a Password "PASS" by the User.

This initialization step is executed when the user is prompted to activate the security function offered on the menu that pops up when his mobile telephone T is switched on. In practical terms this initialization occurs on the first use of the terminal and the card Co of the user present in the terminal T.

This step is executed after the procedure (1) of verifying the PIN (user identification number) of the user, if this function is activated. Accordingly, the user Ao enters his PIN on the keypad of the mobile telephone T. The (U)SIM card Co verifies the PIN by comparing it to the PIN stored in a secure internal memory MSC. If the code entered by the user matches the stored code, or directly if the function is deactivated, the mobile telephone then (2) prompts the user to enter a password. The chosen password "PASS" is entered by the user via the keypad CL, and is stored (3) in the secure memory MSC of the mobile telephone and in the secure memory MSC of the (U)SIM card Co.

An alternative to this is for the password to be stored on a device MST' external to the terminal but having an infrared link, a Bluetooth link L or any other type of link thereto, and a communication interface IC suited to that type of link. It is of the external means that the terminal will request confirmation prohibiting use of the telephone if those means are not in the vicinity.

II—Subsequent Uses

At the time of subsequent uses, the protection mechanism executes the steps whereby the terminal verifies the password.

This verification of the password is in practice effected after verifying the user's PIN.

The PIN is verified by a conventional procedure executed by the (U)SIM card. If the PIN entered by the user via the keypad of the terminal is correct, then the terminal asks the card for the stored password, which the card supplies. At this stage the user does not need to enter the password.

The terminal compares the password supplied by the (U)SIM card and the password stored in one of its internal memories.

If the two passwords are identical, then the terminal becomes operational.

If the two passwords do not match, the terminal asks the user to enter his password again. This request is repeated N times if necessary, if the first password entered by the user is not correct. The number N could be equal to 3, for example.

It is advantageous if the terminal deletes the password stored on the card in the event of failure following the first comparison.

Accordingly, if the user has changed (U)SIM card and the terminal has not been stolen, the user has occasion to enter his password, the terminal prompts him for the password on failure of the first verification (the word supplied by the card to the terminal), and the password entered is stored on his new card.

If the terminal is stolen, verification of the password fails even after various attempts. The terminal then brings about destruction of key internal components rendering the telephone irreparable and consequently unusable.

If the user uses another terminal using a (U)SIM card already containing a password, the user is asked for the PIN for verification purposes and if the PIN is valid, the procedure for verifying the password is instituted. Firstly, and automatically, the card supplies the terminal, at the request of the latter, with the password that it has in its memory; should this fail, the verification applies to the password that the user enters via the keypad. After this verification, either the process has failed, in which case the terminal destroys key components, or it has succeeded, and the password entered is stored on the card.

The process as just described is executed by a "security function" program loaded into a program memory of the mobile telephone. The security function can be activated once and for all by the user, for example on purchasing the telephone.

The security of the MSC memories of the (U)SIM card stems from the security usually implemented in smart cards.

It is physical card security (destruction of the card in the event of intrusion) and logical security (for example countermeasure algorithms).

The security of the storage means of the terminal stems from the use of an ASIC in the terminal to implement the security function and internal processing of data in the component.

The password can be stored as such or in encrypted form and can also be recalculated on each request by the component. The password can be encrypted by a DES (or 3DES) type injective function, or by a hashing function applied to the input data consisting of the personal identification number (PIN) and the password (PASS).

The invention claimed is:

1. A method of securing the use of a mobile telecommunication terminal comprising a subscriber card reader, which method comprises the following steps performed by said terminal:

an initialization step comprising:

requesting the user to enter a personal password after inserting a subscriber card into said terminal, storing for subsequent uses said personal password in said subscriber card and in said terminal, and then on the occasion of subsequent uses:

comparing a password supplied by said subscriber card with said personal password stored in the terminal during said initialization step, if said password supplied by said card is not the same as that which is stored in the terminal, comparing the password stored in the terminal with a personal password entered by the user; and in the event of a mismatch between the entered personal password and the password stored in the terminal, disabling its operation.

2. The method claimed in claim 1 wherein said user is able to enter said stored password N times and if there is no match after N attempts said terminal destroys said password stored on said subscriber card and deactivates itself.

3. The method claimed in claim 2 wherein said terminal encrypts said password information before storing it in said terminal and in said card.

4. The method claimed in claim 3 wherein said password is encrypted by a DES function or a hashing function applied to input data comprising a personal identification number and said password or data internal to said terminal (for example its IMSI) and said password.

5. The method claimed in claim 1 wherein said terminal encrypts said password information before storing it in said terminal and in said card.

6. The method claimed in claim 5 wherein said password is encrypted by a DES function or a hashing function applied to input data comprising a personal identification number and said password or data internal to said terminal (for example its IMSI) and said password.

7. The method claimed in claim 1 wherein said terminal encrypts said password information before storing it in said terminal and in said card.

8. The method claimed in claim 7 wherein said password is encrypted by a DES function or a hashing function applied to input data comprising a personal identification number and said password or data internal to said terminal (for example its IIMSI) and said password.

9. The method claimed in claim 1 wherein said disabling step comprises destruction of internal components of said terminal to render said terminal inoperable.

10. A mobile telecommunication terminal including a program memory containing a program which when executed performs a method comprising the steps of:

requesting the user to enter a personal password after inserting a subscriber card into said terminal, storing for subsequent uses said personal password in said subscriber card and in said terminal, on a subsequent use, comparing a password supplied by said subscriber card with said personal password stored in the terminal during said storing step, if said password supplied by said card is not the same as that which is stored in the terminal, comparing the password stored in the terminal with a personal password entered by the user; and in the event of a mismatch between the entered personal password and the password stored in the terminal, disabling its operation.

11. The mobile telecommunication terminal claimed in claim 10 wherein said program memory is in an application specific integrated circuit.

12. The mobile telecommunication terminal claimed in claim 11 including a communication interface for communicating with an external memory device connected to said terminal to store said password.

13. The mobile telecommunication terminal claimed in claim 10 including a communication interface for communicating with an external memory device connected to said terminal to store said password.

14. The mobile telecommunication terminal claimed in claim 10 wherein said disabling step comprises destruction of internal components of said terminal to render said terminal inoperable.

15. A method of securing the use of a mobile telecommunication terminal comprising a subscriber card reader, which method comprises the following steps performed by said terminal:

requesting the user to enter verification information after inserting a subscriber card into said terminal, storing for subsequent uses said verification information in said subscriber card and in said terminal, on a subsequent use of said terminal, comparing verification information supplied by said subscriber card with said stored verification information, if said verification information supplied by said card is not the same as that which is stored in the terminal, comparing the verification information stored in the terminal with information entered by the user at the time of the subsequent use; and in the event of a mismatch between the entered personal password and the password stored in the terminal, disabling its operation.

16. The method claimed in claim 15 wherein said disabling step comprises destruction of internal components of said terminal to render said terminal inoperable.

* * * * *